(12) United States Patent
Ilnicki

(10) Patent No.: US 8,427,966 B2
(45) Date of Patent: Apr. 23, 2013

(54) PROGRAMMABLE PASSIVE PROBE

(75) Inventor: Slawomir K. Ilnicki, Los Altos Hills, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 681 days.

(21) Appl. No.: 11/925,082

(22) Filed: Oct. 26, 2007

(65) Prior Publication Data

US 2009/0109973 A1  Apr. 30, 2009

(51) Int. Cl.
*G01R 31/08* (2006.01)

(52) U.S. Cl.
USPC ........... 370/252; 370/253; 370/254; 709/220; 709/221; 709/222; 709/223; 709/224; 709/225; 709/226

(58) Field of Classification Search .......................... None
See application file for complete search history.

(56) References Cited

U.S. PATENT DOCUMENTS

| | | | |
|---|---|---|---|
| 6,598,034 B1 * | 7/2003 | Kloth ............................. | 706/47 |
| 6,651,099 B1 * | 11/2003 | Dietz et al. .................... | 709/224 |
| 7,342,897 B1 * | 3/2008 | Nader et al. ................... | 370/255 |
| 7,451,216 B2 * | 11/2008 | McKinley et al. ............. | 709/225 |
| 7,483,379 B2 * | 1/2009 | Kan et al. ....................... | 370/237 |
| 7,742,404 B2 * | 6/2010 | Sivakumar et al. ........... | 370/229 |
| 8,243,599 B2 * | 8/2012 | Becker et al. .................. | 370/232 |
| 2004/0052259 A1 * | 3/2004 | Garcia et al. ................... | 370/392 |

* cited by examiner

*Primary Examiner* — Jae Y Lee
*Assistant Examiner* — Aixa A Guadalupe-Cruz
(74) *Attorney, Agent, or Firm* — Volentine & Whitt, PLLC

(57) ABSTRACT

A configurable probe takes advantage of inter-dependent probe control elements that pass data control signals from one controelement to the other for controlling data extraction. The control elements operate in parallel on one word at a time, based upon a state established by one of the control elements. The data to be considered is established by timing offsets dependant upon packet header lengths, and a function to be performed on the data is controlled by individual control units based upon template information individual to each control element. The probe is agnostic about protocols. It operates on stream of packet words and executes its functions according to defined templates. It is the host that controls the probe and determines what protocol header to parse and how. The controlling host instructs the probe via defined templates that act as state machine definitions what to do and when.

22 Claims, 9 Drawing Sheets

| PROTOCOL | HEADER TYPE STATE | DEFAULT HEADER SIZE IN 16 BITS | OFFSET OF HEADER SIZE AND MASK | NEXT PROTOCOL TYPE OFFSET AND MASK | NEXT PROTOCOL VALUE | NEXT PROTOCOL VALUE | ... | NEXT PROTOCOL VALUE |
|---|---|---|---|---|---|---|---|---|
| ETHERNET | 0 | 7 | | | | | | |
| VLAN | 1 | 2 | | | | | | |
| MPLS | 2 | 2 | | | | | | |
| IP | 3 | 10 | | | | | | |
| GRE | 4 | 10 | | | | | | |
| TCP | 5 | 10 | | | | | | |
| UDP | 6 | 8 | | | | | | |
| APPLICATION | 7 | 1000 | | | | | | |

PROGRAMMABLE PASSIVE PROBE

TECHNICAL FIELD

This disclosure relates to monitoring network traffic using probes and more specifically to systems and methods for building such probes within an existing framework.

BACKGROUND OF THE INVENTION

Existing probes perform monitoring functions on Internet traffic. These monitoring functions typically involve performing some operation on data (such as Ethernet) inside packets or frames, that is passing through a particular point (the probe point) in the network. Typical functions would be, for example, filtering of data, capturing data, forwarding captured data, summarizing data, etc. Existing probes are standalone devices that tap into the communication line via a splitter or as an in-line device. Some of these probes are positioned in interface converters in association with switches and routers. The interface converters serve to convert data signals from one medium, such as fiber, to another medium, such as copper. The existing probes working as standalone devices are configurable to gather data of different types in different arrangements are expensive and require a footprint usually the size of a laptop. Probes that are part of an interface converter or part of a switch or router line card have small footprints but they have the limitation that they are very specific in nature. Thus, when trying to use a probe in a confined space it is necessary to limit the functions that the probe provides in order to use a small footprint probe. Such a probe is either implemented in FPGA or hardware like ASIC. Typical implementation of a probe in ASIC does not allow for changed operation of a given probe.

BRIEF SUMMARY OF THE INVENTION

A configurable probe takes advantage of inter-dependent probe control elements that pass data control signals from one control element to the other for controlling data extraction. The control elements operate in parallel on one word at a time, based upon a state established by one of the control elements. The data to be considered is established by timing offsets dependant upon packet header lengths, and a function to be performed on the data is controlled by individual control units based upon template information individual to each control element. The probe is agnostic about protocols. It operates on stream of packet words and executes its functions according to defined templates. It is the host that controls the probe and determines what protocol header to parse and how. The controlling host instructs the probe via defined templates that act as state machine definitions what to do and when.

In one embodiment, templates loaded into various of the probe's control elements operate to control the functions performed by the associated control element. These functions are dependant upon signals received from other of the control elements and not dependent upon a central memory of protocols. This then allows the probe to be controlled in a permanent hard-wired fashion, such as by an ASIC. The profile of the probe using these concepts can be made small enough to fit within the footprint of existing "small footprint" probes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

This invention addresses a probe that is implemented in hardware consisting of several control elements. Each control element has built-in functions that are controlled by input signals from other control elements and templates associated with a specific control element that defines when a built-in function is to be executed. In one embodiment, the implementation of a probe operating in accordance with the concepts of this invention contains control elements such as Packet Header Parser (PHP), Packet Filter (PF), Packet Data Extractor (PDE), Packet Sampler (PS), Output Buffer (OB) and Configuration Controller (CC). Arriving packets or frames are received by the probe in the form of words, i.e., one packet word at a time. The packet word size could be one, two, four, eight and so on bytes. This is implementation dependent. A packet word is a unit upon which the control elements operate. With each packet word there is associated an offset relevant to the beginning of the packet word with respect to the beginning of a designated boundary that could be, in a typical case, the beginning of a specific protocol header. In general, the control element receives a packet word as it is passes through the probe and uses data from its template to see if an operation is to be performed. As packet words arrive, the PHP examines the data to see if it has a relevance to data in its template by looking at the offset and a type of header that is currently being processed by PHP. At the same time, PF, PDE and PS are executing in parallel, but the PF and the PDE are driven by the PHP output signal that is packet header type also referred to as a state (state of the packet header processing) and offset from the beginning of the header. The PS, if it is activated via configuration, operates on entire packet or frame and as an output provides a signal if a given packet is to be considered for packet inspection or not. In one embodiment, the PS would send a "skip" signal instead of a "commit" signal and this would then instruct the PF and/or the PDE to do nothing with the packet. When the packet filter matches in its entirety then extracted data if any will be "committed" i.e., valid to be sent out. The PDE extracts data and stores that data in a buffer (OB). When the buffer meets certain criteria, such as time or size of the buffer, the data in the buffer is sent out by the probe. The concepts discussed herein allow a probe to be contained on an ASIC or on a FPGA.

Figure 1:
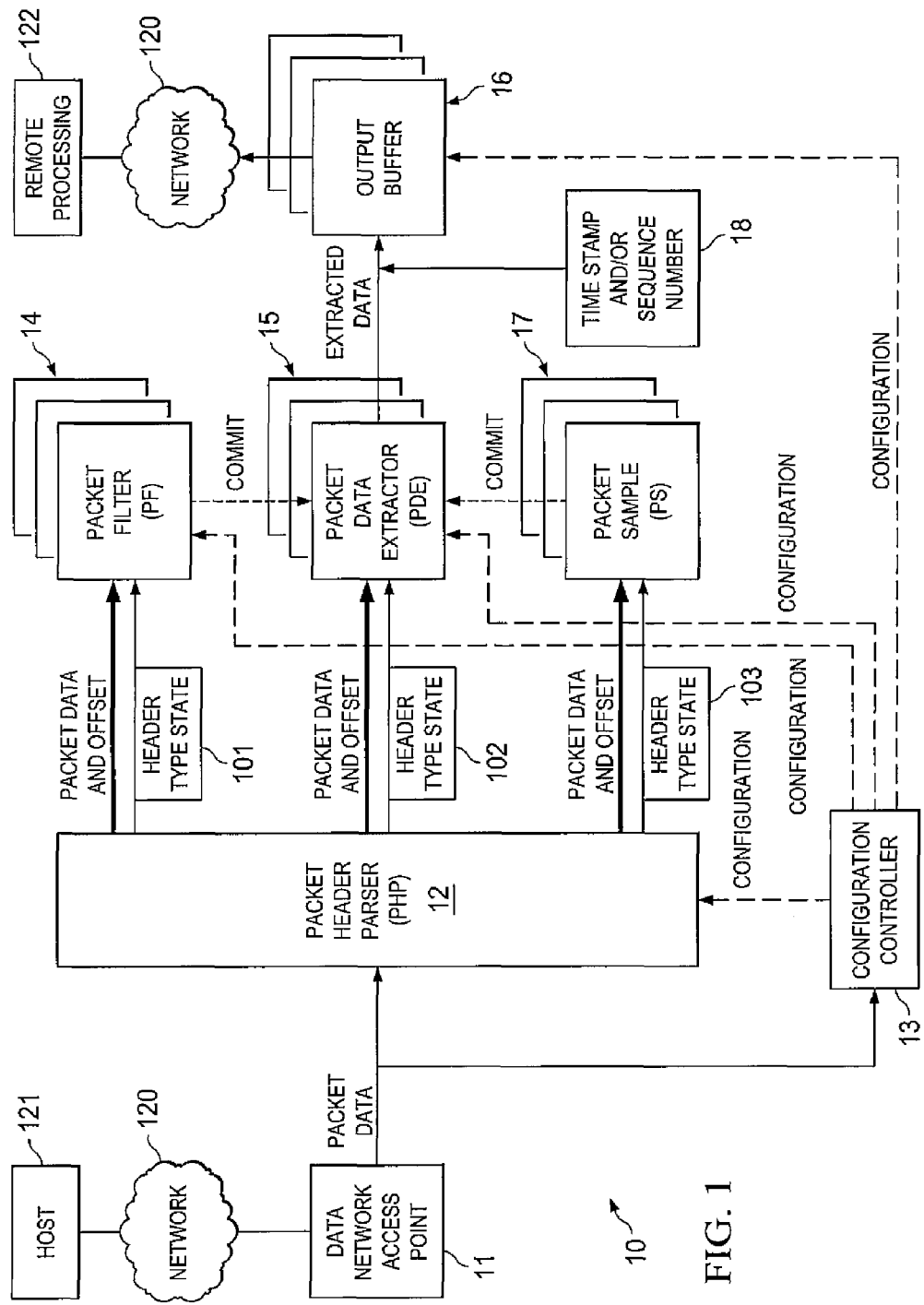
FIG. 1 is a block diagram of one embodiment of a probe constructed in accordance with the teachings of the present invention.

FIG. 1 is a block diagram of one embodiment of a probe, such as probe 10, constructed in accordance with the teachings of the present invention. In one embodiment shown in FIG. 1 the probe is an in-line device that passes through traffic (not shown) and has capability to intercept "passing by" packets, process them and send results to a location remote from the probe. One hardware implementation of such probe could be a modified standard Small Form-Factor Pluggable (SFP) gigabit interface converter (transceiver). The standard SFP is an analog device that converts electrical signals (NRZ data) into optical or electrical signals of 1 Gigabit Ethernet. Probe 10 "breaks" the analog signals by converting them into digital signals and reversing on the way out from digital to analog. A typical fiber version of a SFP has a size of 13.7 mm (W) by 55.9 mm (L) by 8.5 mm (H). This means that a probe embedded in such transceiver must be a very small ASIC chip, e.g. 5×5 mm.

The passive programmable probe shown in FIG. 1 processes packets from a data network 120 access point, such as from access point 11, according to defined/configured packet filters, such as packet filters 14, and compares data from the packet according to defined templates with data in the stored packet filter values (packet filter definition) for periods of time. The probe contains at least one packet header parser (PHP), such as parser 12, several packet filters 14 (PF), several packet data extractors 15 (PDE), and at least one output buffer 16 (OB). The packet header parser, packet filters and packet data extractors are controlled via configured templates.

For example, the first element of the several probe control elements in this embodiment is a packet header parser. Its template tells PHP how to process (parse) packet headers. It is a state machine where each state represents different protocol header type. The protocol header type signal drives the templates of the packet filters and packet data extractors which comprise the other probe data extraction control elements. The templates are instructional in nature and, as will be discussed, can be changed from time to time. The probe extraction control elements are inter-dependant upon one another and this inter-dependence is controlled, in part, by data in the various templates and upon the state of one or more of the control elements.

The actual state of the packet processing is the protocol header type that is currently received and processed by the probe. In one embodiment, the implementation is a data flow machine in which packets are processed as they arrive one packet word at a time. A packet word is defined as multiplication of bytes i.e., depending on implementation it could be one, two, four, eight, etc. number of bytes per word. Packet word is a unit upon which a control element operates at any given time. In one embodiment, described herein and exemplified in the form of the templates assumes a packet word length of two bytes. When the packet data flows through the probe, it is parsed at the same time it is subject to filtering and data extraction. The reason for processing of packets "on the fly" (real time) is to reduce latency which allows the probe to keep up with incoming data traffic.

As packet words flow through packet header parser (PHP), the PHP uses the data from its template to determine what is the next packet header and to also determine when the next header starts. The output signal from PHP is the header type (a state), as will be discussed herein after. Also determined by the PHP is the header starting point as an offset of a packet word in relevance to the beginning of a specific packet header. It should be pointed out here that PHP does not understand the concept of packet header. It is "told" or programmed via its template what to do when packet offset reaches certain value. For example, the PHP may extract the data from the packet header that describes the packet header size. It also it is instructed where to look at for the next protocol header type. The header type and the offset drive the templates of the PF and PDE. For example, a first packet header is Ethernet by default. This of course could be changed by configuring a different template in the PHP. The PHP (based on its template data) looks for Ethernet type that is at offset 6 (16-bits words) and tells PHP that when Ethernet header completes, there will be a next protocol header according to the type. In case of Ethernet, the size of the packet is fixed. VLAN for example could be considered as a different header type but does not have to be. If it is not then PHP must keep processing VLANs if Ethernet plus VLAN is considered as one protocol header type. If the next protocol is e.g., IP then the PHP, while processing the header, must also assess the size of the IP protocol header. The IP protocol header may very in size when options are used and therefore the PHP template defines where the size of the IP header resides. Once this field as a packet word arrives at the PHP, it is processed accordingly and IP protocol header size determined.

Thus, at offset 6, the incoming data will have a value that represents the Ethernet type. The PHP template contains values with each value representing an Ethernet type. The PHP parser has an engine (not shown) that once the packet data reaches offset 6, it compares in parallel the several values of Ethernet type from the template looking for equality with the actual data contained in the data stream at offset 6. If the Ethernet type (as contained in the actual incoming data value) matches a value that is in the template, then, when the Ethernet header reaches the end, the PHP will raise a signal (value) of the next header type or state based upon information obtained from the template. Note that the probe did not have to "know" this type itself since the template carries with it the necessary information to allow for a translation from the value contained in the actual data to a data type. This then makes it relatively easy to program the probe for different protocols as they evolve by sending different templates to the PHP or to the PF or PDE, as necessary.

Since the PHP, PF and PDE process packet words in parallel as they move through the probe several instances of PF and PDE run in parallel at the same time filtering or extracting data from the packet according to their own respective templates. In other words, the passive programmable probe has built in operations that are invoked only when packet data reaches certain offsets defined in the templates. As discussed above, the probe itself does not know about the protocol it is following nor does the probe know about the packet it is processing. The probe knows what it is looking for and when it will arrive, based upon template information and assisted by value and mask tables. Thus, the probe does not understand that a data stream is Ethernet or IP header. However, elements within the probe are programmed via the templates particular to each probe control element instruct that element as to what to do when a certain packet reaches a certain offset. The probe itself knows how to perform all of the functions as controlled, for example by hard-wiring, ASIC, etc. However, the hard-wiring does not know what or when to perform the function unless instructed from time to time by a template loaded into one of the probe elements. Note that the probe can be configured with a default set of values so that the probe will work if, for example, one or more of the templates is unavailable, either because of data corruption or because of downloading problems, etc. Also note that if desired only specific data fields need be monitored at any one time. The templates allow each probe to be re-configured to handle other data or other protocols as necessary.

Figure 2:
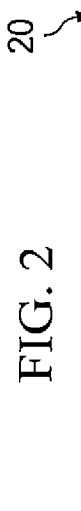
FIGS. 2, 3, 4, and 5 show embodiments of templates used for programming at least a portion of the passive probe.

FIG. 2 shows, by way of example, PHP template data 20 for a probe configured with a typical protocol stack.

Figure 3:
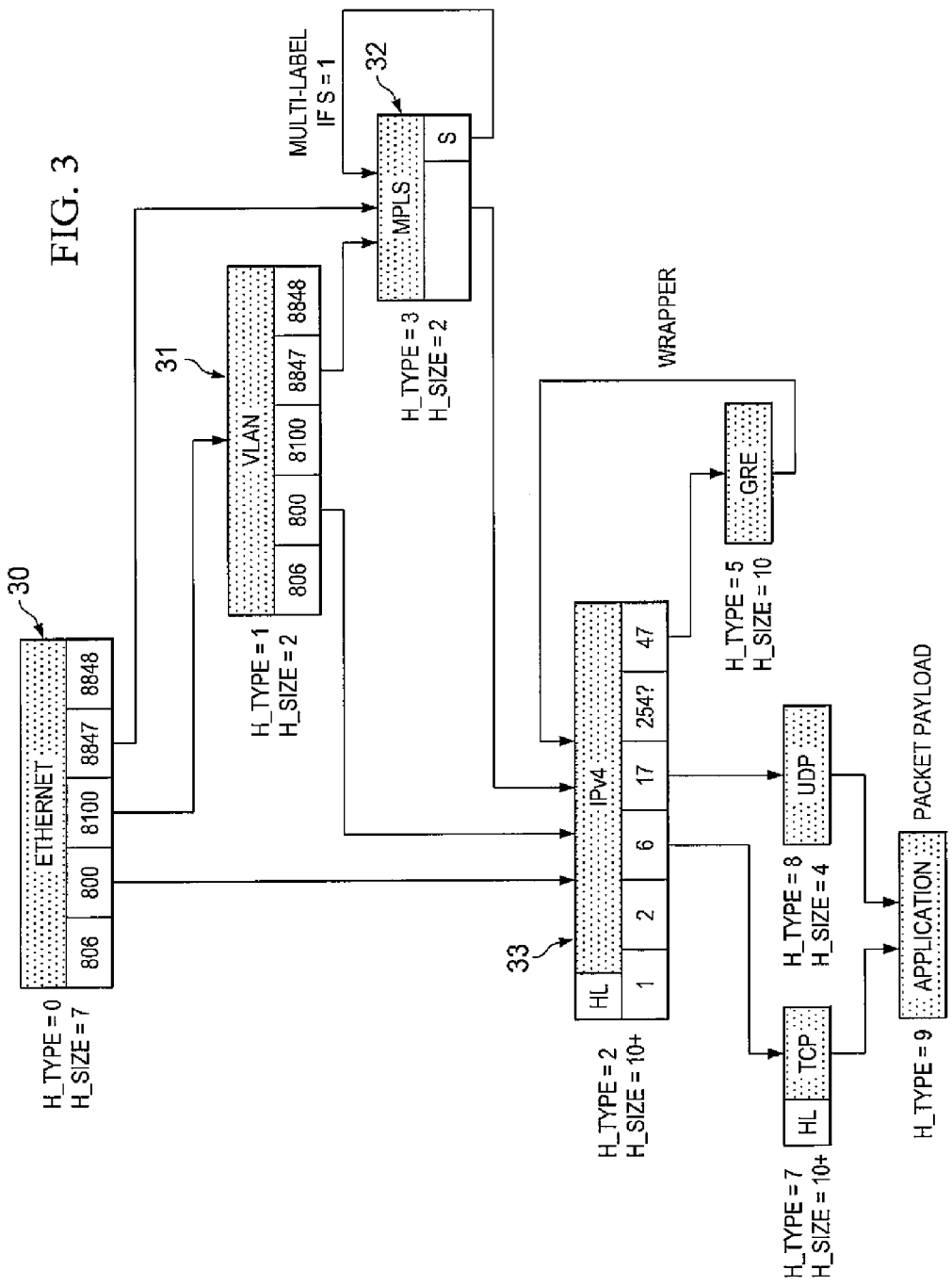

FIG. 3 shows a PHP protocol tree based upon template 20. Thus, if PHP at offset 6 of Ethernet header "discovers" (as discussed above based on the template being used by PHP) that the next protocol is IP then it will raise the signal, for example, by setting a value of 3 (state=3) when offset 7 is reached. Thus, at the completion of the $6^{th}$ offset the then-current state of packet processing is IP (state=3). This will happen if matched Ethernet type is 0x800, as shown at process 30. When this occurs the PHP resets the offset to 0 because all other templates (PF and PDE) are based on offset from the beginning of the packet header that is currently passing by. It should be noted here that PHP will also be at IP state (state=3). In other words each control element is entering a state driven by PHP and performs functions according to this state using its template as a definition of performed functions.

Figure 4:
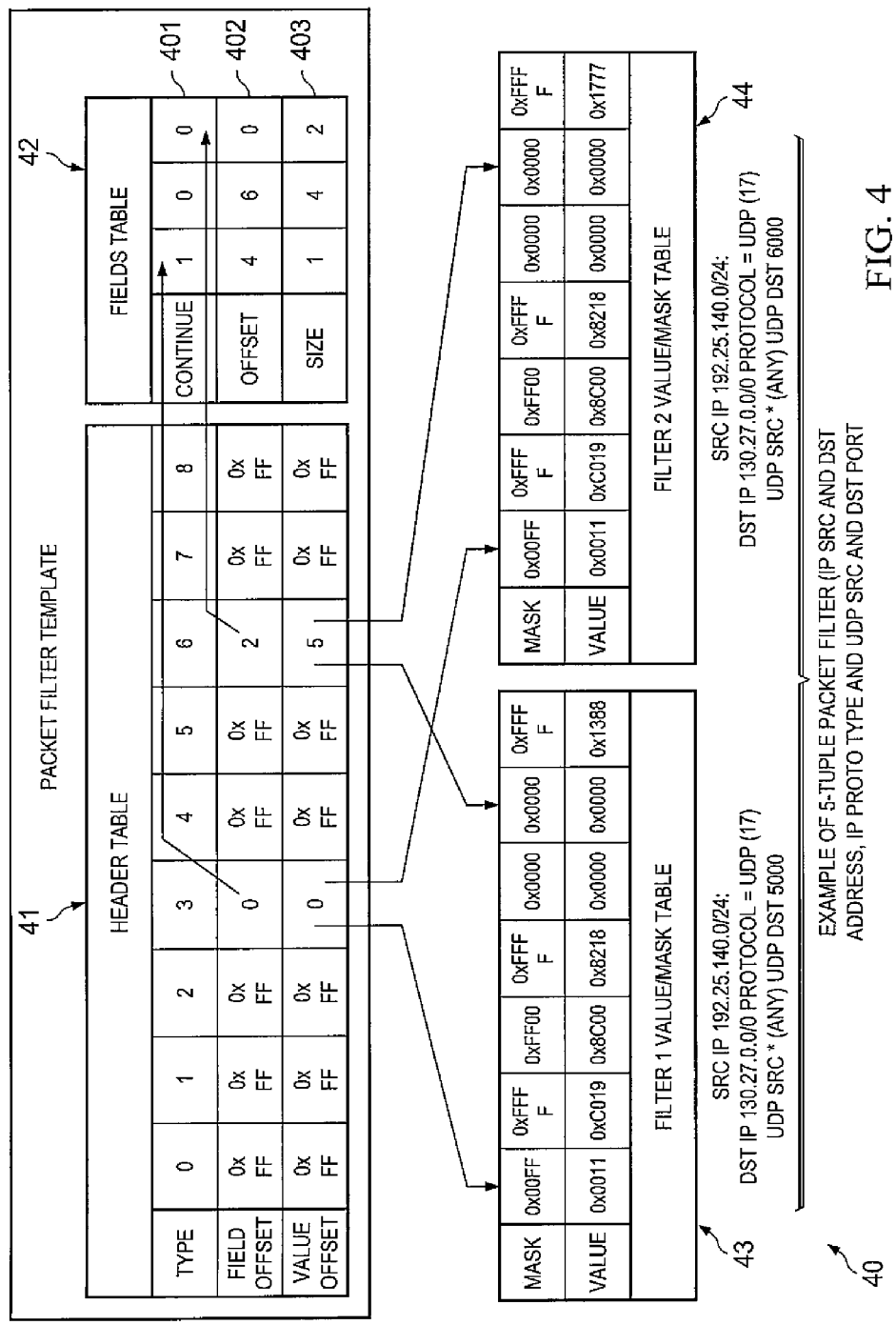

FIG. 4 illustrates one embodiment 40 of the PF template and packet filter Value and Mask tables. The probe may execute several packet filters which can, if desired, be grouped to share one type of template, but the probe may have several different templates running concurrently. All filters are processed in parallel. However, to avoid confusion herein, the example being discussed will discuss only a single packet filter definition and two different filters. Template 40 is defined for 5-tuple filter (IP source and destination address, IP protocol type and port source and destination). The representation of the template is for packet word size of 2 bytes in this embodiment.

In operation, the PF will do nothing and will allow packets to move by until it receives signal 101 (FIG. 1) from the PHP (as discussed above) that the incoming packet words are IP header data. When the PF is activated by the signal from the PHP, it fetches data from fields table 42 which is part of the template information. The offset to this table is in header table 41 and depends upon the protocol header type or protocol header state as signaled from the PHP. PF extracts from this table the offset (row 402) from the beginning of the IP header and the size (row 403) of the field to be examined. PF then waits until the offset reaches the offset as obtained from the fields table. Row 401 indicates if the next field belongs to the same packet header type. Value of "1" means continue (there are more fields for the same header) and value of "0" means last field that belongs to the same header. In this example IP header contains two packet header fields, one for protocol type and one for IP addresses. The IP addresses source and destination are grouped into one field because they are adjacent to each other. Of course, those IP addresses could be split into two fields but this is not an effective use of resources. The purpose of the PF is to consider what data is to be saved by the data extraction elements which are working in parallel. When the consideration is positive, a commit signal is sent to the other control elements as will be discussed.

When the offset (in this example offset 4) is reached, PF fetches data Value and Mask table values from table 43, masks packet word using mask from table 43 first and compares the values from table 43 with incoming masked packet word in the example a 2 byte value. Note that FIG. 4 depicts a specific organization of the data. In a more general case the PF template is driven by header type that allows for the extraction of data from tables according to an offset from the beginning of packet header and compares the fetched values with values stored in the template. This is all based on the state of the probe as set by PHP. The PF keeps track off all matched packet filter values. If one of the examined packet filter values does not match, the PF notices this as "unmatched" filter. Only a matched filter will be considered after entire packet filter is processed. For example, if packet filter is (as on FIG. 4) IP src=192.25.140.0/24; IP dst=130.27.0.0/0; protocol type=UDP (17); UDP sre port=* (any) and UDP dst port=5000 and if everything matches except UDP dst port then a particular packet will be considered as "unmatched" with respect to this particular filter. It may match filter 2 on FIG. 4 if the UDP dst port in the packet is 6000.

PDE 15 (FIG. 1) operates in parallel with the PF to extract certain data from the data packet passing by the access point. The data to be extracted by the PDE, packet word by packet word according to its own template(s) also based on the state information from PHP as shown in process 102. Data extracted by the PDE is stored in output buffer 16 but it is not committed. Extracted data is committed if one of the packet filters associated with specific PDE fires (matches) and if an associated packet sampler, such as packet sampler 17, if configured, also fires, i.e., it signals to accept data from this packet. It should be noted that the meaning of packet filter "matching" could be considered as exception, i.e., instead of looking for equality the probe could look for non-equality. In this case, we define an "exception packet filter" i.e., a packet filter which when all values match the probe will not take any action. This is the reverse of a normal packet filter matching pattern. For example we may want to capture all traffic except specific one like IP multicast, ICMP, etc. It is conceivable that packet filter definition (template) could also contain logical operations like NOT, OR and AND that could instruct the packet filter how to deal with packet filter fields. For example, the packet filter template may contain information (not shown in FIG. 4) that for example if IP addresses match the packet filter values AND for example destination port does NOT match its value. In other words, filtering operations may not be limited to all match or all unmatch but to operations specified by, for example Berkley Packet Filters (BPF), logical operations.

The PS works on the entire packet and is either associated with a specific packet filter or PDE. It could be configured as discrete or random. Discrete will mean that packet data are only "committed" by PDE if N number of packets passed that matched a particular filter or where destine to particular PDE as committed. A packet filter could be defined as completely open, i.e., any packet and in this case only every N-th packet data will be considered as committed by PDE. For example, if N=1000 then only every 1000-th packet flying by that matches particular criteria (e.g., packet filter matches) will be considered for data extraction. In random case there are three values defined for PS: min, mean and max. The number of packets that are passing by and meeting matching criteria has to also match the value of the PS random number. For example, if the PS has defined values: min=5000, mean=7000 and max=10000. First the PS will draw a random number between 5000 and 10000 with distribution of mean value of 7000. Lets assume the PS picks value of 8450 then 8450-th packet will be considered committed. Once this packet is selected, then PS picks a new random number for the next series of flying by packets. If PS is associated with a packet filter, then the PS sample number only applies to filtered packets that match a particular filter. The PS can be a stand-alone element or could be part of either or both of the PF or PDE. Typically, the packet sampler will be turned off. However, if the generated resultant data (extracted data) is high and creates a lot of traffic then packet sampling could take place thereby reducing what data is to be considered and eventually extracted.

Figure 5:
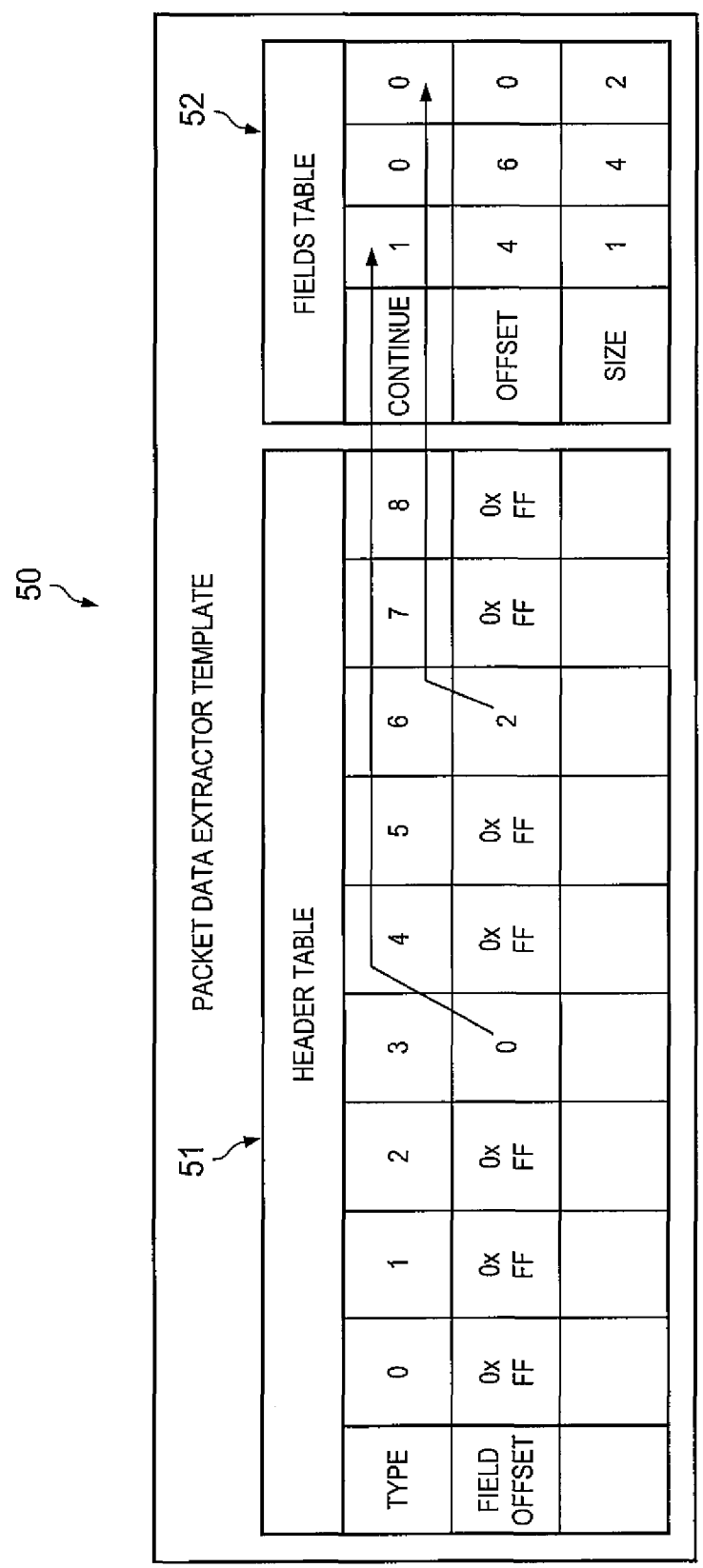

FIG. 5 shows one example of a PDE template, such as template 50, where the extracted data matches the same fields as packet filter. Note that fields table 52 of PDE template 50 matches table 42 of PF template 40. This is but one example to simplify description. In other PDE templates the PDE may be instructed to only extract certain data from the offset location of the packet and not all the data. For example, the instruction could be to capture only the first N packet words, or to capture specific packet words from specific packet header(s) or packet payload that by itself is considered as special packet header.

The extracted data could be time-stamped by the probe and/or a sequence number could be associated with the extracted data via controller 18 (FIG. 1) to deal with lost extracted data when the data is sent from the probe. This may be necessary when the probe uses unreliable transport so it is possible to capture results that go missing between the probe and a remote processing point such as point 122.

Note that the templates execute simple programs based upon locations of data and data types and do not process data based upon known or stored protocols that are pre-stored in the probe. This then allows the probe to be flexible in processing various protocols while still preserving a small footprint. The probe uses the packet protocol header as a state in which the PF and PDE operates. If the header table entry of PF or PDE does not have a value specified for a specific state (header type) the probe will ignore any operation on a current protocol header passing the probe. In other words, the header table is a simple state machine with two states to either do nothing or process data according to a position (offset) of that data in a stream of data passing the probe.

The passive probe is programmable via state machine information that is sent by a controlling host, such as host 121, via data network 120. The controlling host understands what it needs to have monitored or reported with respect to data packets passing through access point 11 and thus through probe 10. The host sends templates to the probe (in one embodiment by using an IP address of the probe) which templates are extracted from the data stream by configuration controller 13. These templates are then stored in the probe, for example, in PHP, PF, PDE and PS and serve to provide the probes with scripts or programs for operating on specific data.

New templates are only sent if the controlling host decides to change what it wants a probe to do with packets. The host may change packet filter values and masks more often than templates. In fact, a template once sent may not change at all, but the user may decide that he/she wants to extract different data according to packet filter values and using the same packet filter template e.g., 5-touple. For example, the user may try to capture HTTP traffic (TCP port 80) or may decide to capture SSH traffic (port 22). If the user would like to capture ICMP traffic and PHP, PF and PDE templates do not include ICMP protocol headers, then new templates must be sent to the probe. The PHP template may already include ICMP, but the PF template may not, i.e., 0xFF entry in header table is an example of how an entry could be marked as invalid. In such a situation, then PF template must be replaced or updated. Note also that a counter or other mechanism can be used, if desired, to keep track of various characteristics of the extracted data, even if that data is not subsequently forwarded to a remote location. For example, the size of the packets can be stored and an average size sent to the remote location. Or the number of packets can be counted, all under control of template information. Again, as discussed above, the probe need not know anything about the packets or their types, but rather the probe operates on data at a certain location based upon matched or masked values as controlled by the templates.

Note that it is important for the meaning of the state to be the same across all the templates. If, for example, IP header type in the PHP is defined as value 5, then all other templates must also "understand" that value of 5 is IP header. In other words, those templates have to be consistent with respect to header type or packet header state.

FIGS. 6 through 9 show embodiments of operational aspects of the passive probe.

Figure 6:
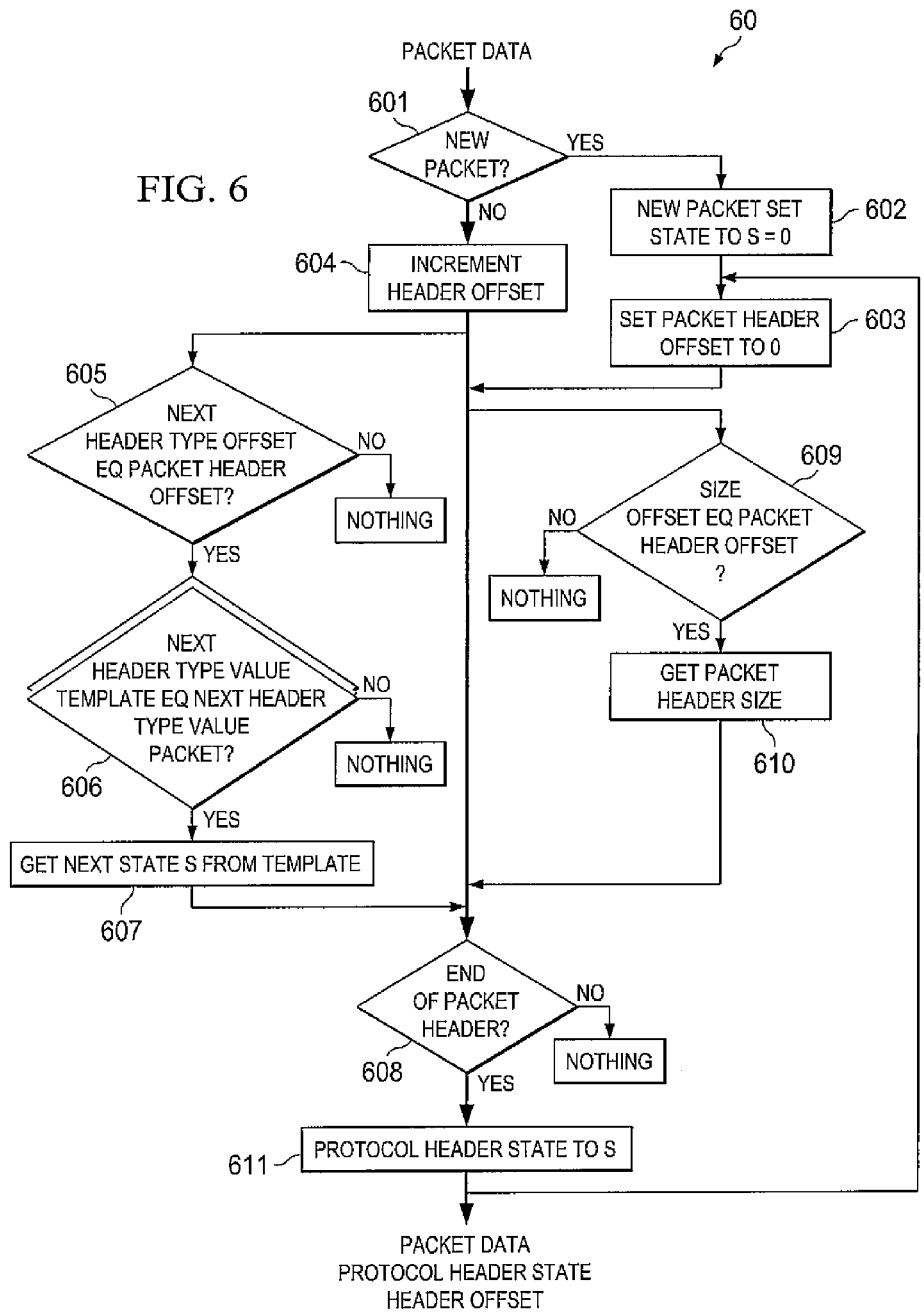
FIG. 6 shows one embodiment of a process for controlling data capture using a passive programmable probe.

FIG. 6 shows one embodiment of process 60 for controlling data capture using a passive programmable probe. As discussed above, packet words flow through packet header parser at process 601, and the PHP uses the data from its template to determine the course of action other control elements of the probe will perform. If process 601 determines that a new packet has arrived then process 602 sets the state to zero. This also could be the default state when a template is not available. Process 603 also sets packet header offset to 0. If this is not a new packet then process 604 increments the offset header to reflect where in the data stream the PHP is operating.

Process 609 determines if the packet size offset equals the packet header offset. If it does then process 610 obtains the header size. It should be noted here that a PHP template also contains default sizes of the protocol header (FIG. 2). And those default values could be overwritten if a particular protocol header (FIG. 2). And those default values could be overwritten if a particular protocol header type includes a size field or bits indicating different size than the default. Process 605 determines if the next header type offset equals the packet header offset. If it does then process 606 determines, as discussed above, if the next header type value as contained in the word being read from the data flowing past the probe matches any of the next header type values as obtained from the currently active PHP template. Note that in the embodiment being discussed this function is performed in parallel as shown by the extra box(s) shown at process 606.

If process(s) 606 finds a match then process 607 determines the next state from the template and process 608 continues to check if this is the end of a packet header. If the end of a packet header is reached then PHP sets new packet header state and passes this state along to the other control elements as discussed above together with the offset information. Thus the probe uses the packet protocol header type as a coordination mechanism allowing the different control elements to work in parallel.

Figure 7:
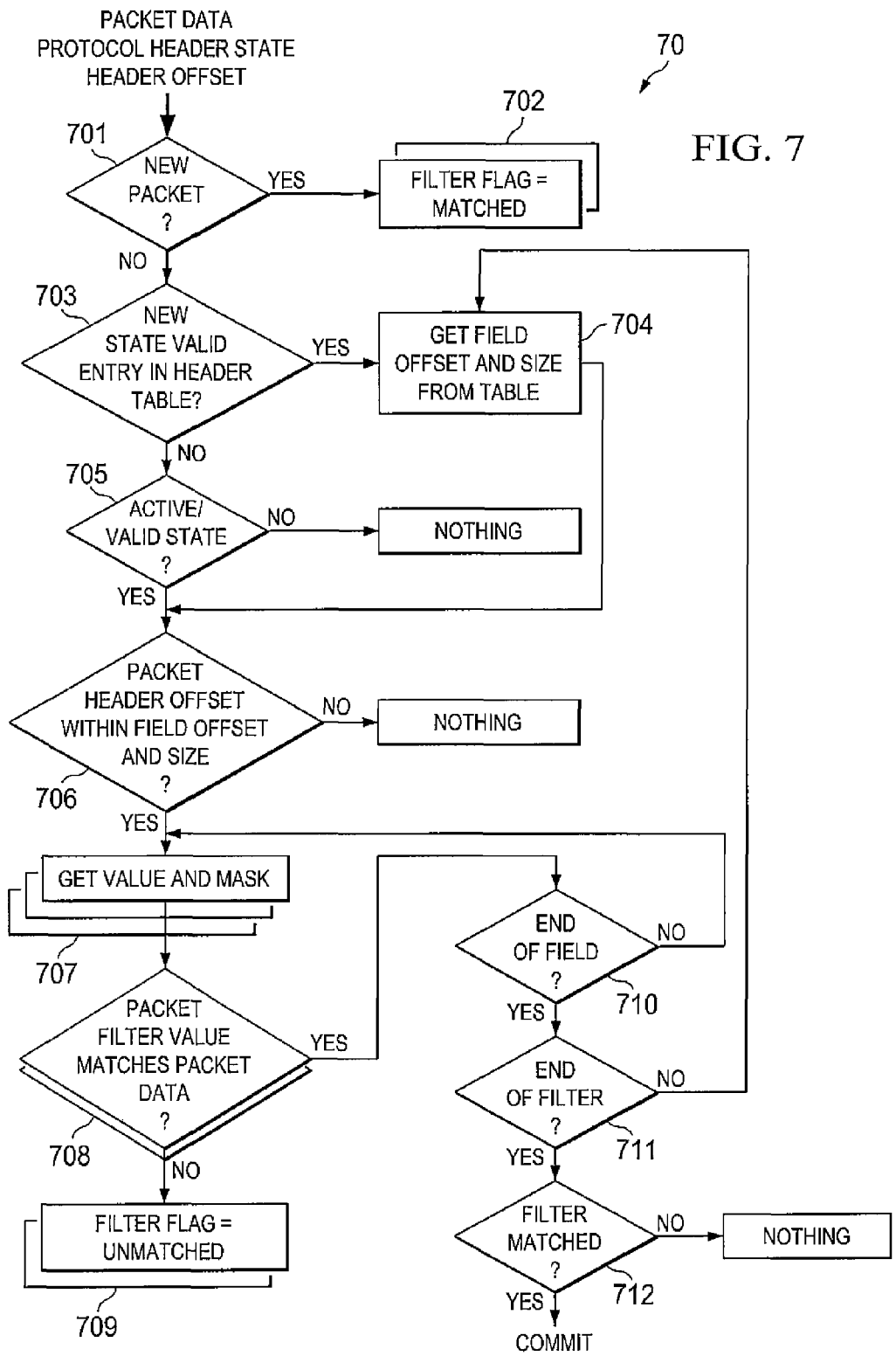
FIGS. 7 through 9 show embodiments of operational aspects of the passive probe.

FIG. 7 shows one embodiment of process 70 wherein process 701 determines if a word from a new packet is being received. If it is the beginning of packet process 701 causes process 702 to set a flag saying that the packet "matched" packet filtering criteria. And if during the packet filter processing one of the packet filters does not match then this flag will be reset to "unmatched". If this is not the beginning of the packet then process 703 determines if there is a packet header type/state change. If it is, then process 704 obtains the field offset from the template field table and passes that information to process 706.

If there is no state change, then process 705 determines if the PF is operating in an active/valid state. If it is, then process 706 determines if the packet header offset matches the field offset. If it does, process 707 obtains the Value and Mask data from the PF template. Again, as noted above, this function is performed in parallel over several different values, i.e., different packet filters that are configured/defined.

Process(s) 708 then determine if the values obtained from the actual packet word that is masked matches the values obtained from the PF template. If no match occurs, then process 709 sets the filter flag to unmatched. When a match does occur process 710 determines if the field has ended, if not then process 707 is repeated when a new packet word arrives. If the field has ended then process 711 determines if this is the end of the packet filter definition. If not, then process 704 is repeated to prepare for the next packet word. If the filter has ended then process 712 determines if the filter has been matched. If it has a commit signal is set. The commit signal is used by other control elements as discussed above and as will be detailed with respect to data extraction as shown in FIG. 8.

Figure 8:
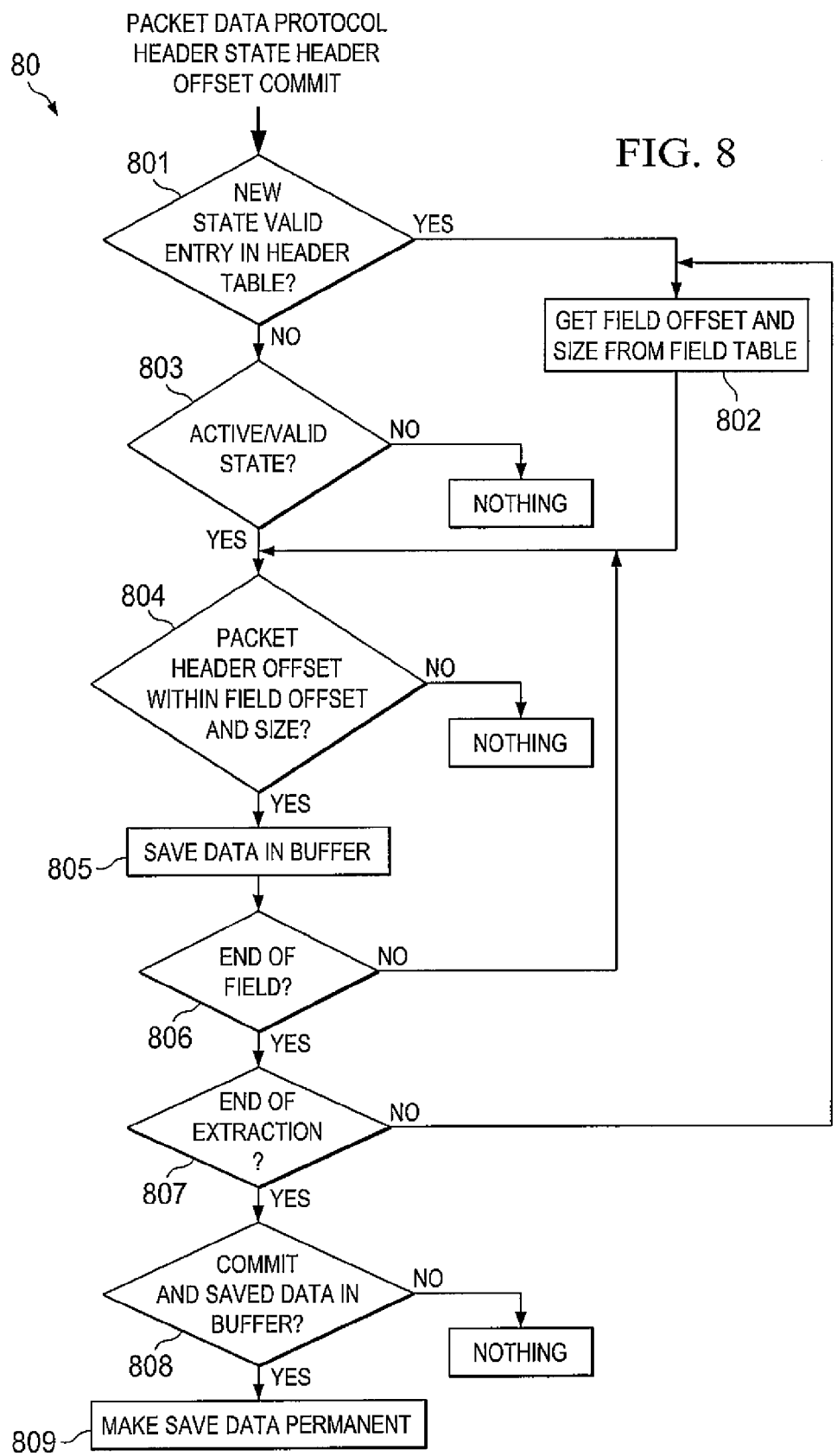

FIG. 8 shows one embodiment of process 80 wherein packet data extraction is controlled. Process 801 determines if a protocol header type/state changed and it has a valid entry in the PDE template header If so, then process 802 obtains the field offset and size information from its template. If there is no state change, then process 803 determines if the PDE is operating in an active/valid state. If it is, process 804 checks to determine if the passing by packet word belongs to a valid field. If it does not belong to a valid field it is ignored.

Process 805 then saves any captured data into a buffer, such as output buffer 16, FIG. 1. Process 805 determines if the field is ended and if so, process 807 determines if this is the end of the data extraction. If not, process 802 is repeated, i.e., preparing PDE to process next packet word. If the data extraction has ended then process 808, based on whether or not a commit signal has been received from the PF, either ignores the packet word or process 809 makes the buffered data permanent.

Figure 9:
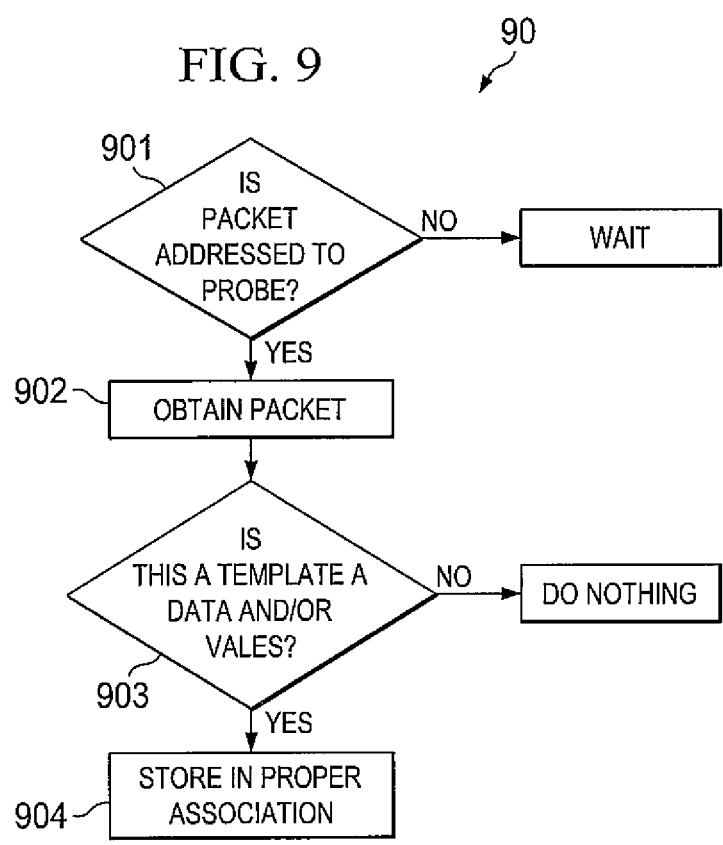

FIG. 9 shows one embodiment of process 90 for controlling the downloading of templates by the passive programmable probe. The templates act as a program for temporarily controlling one or more elements of the probe to perform functions on data in accordance with states established by one or more of the elements. As shown in FIG. 9, process 901 determines if a data packet or packets are addressed to the probe. If so, process 902 removes the packet from the data stream and if process 903 determines that this data represents a new or revised template or template values, the received data is stored via process 904 into memory for use by one or more of the control elements of the probe. The control elements being discussed in this embodiment are the PHP, the PF, the PDE and the PS. This downloaded data represents new or updated templates and/or values to be used in conjunction with the templates. As discussed above, the template and/or value data can be stored in memory in physical association with the respective element to which it pertains or the template data and/or values could be stored in a central probe memory.

Although the present invention and its advantages have been described in detail, it should be understood that various changes, substitutions and alterations can be made herein without departing from the spirit and scope of the invention as defined by the appended claims. Moverover, the scope of the present application is not intended to be limited to the particular embodiment of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of monitoring a communication network, the method comprising:
    sending instructional templates via the network to a probe inserted at a data access point in said network, said templates for storage at said probe for a period of time, each said template stored at said probe in association with a particular one of various probe control elements of said probe, said control elements comprising a packet header parser, a packet filter and a packet data extractor; each said template defining when to execute a function and defining a location of data in a data stream for said control elements to execute said function on, said control elements acting in parallel with each other and in dependent fashion upon each other;
    wherein said templates comprise at least a packet header parser template, a packet filter template and a packet data extractor template; and
    receiving information from said probe, said received information resulting from a function executed on particular data by said probe, said data passing by said data access point, said data function and a location of said data being in accordance with said information contained in said templates.

2. The method of claim 1 wherein some of said control elements are packet filter elements, said packet filter elements using value tables.

3. The method of claim 1, wherein the probe is contained on one of: a single Application Specific Integrated Circuit (ASIC) chip, and a single Field Programmable Gate Array (FPGA) chip.

4. A method of monitoring a communication network, the method comprising:
    causing a probe inserted at a data access point in said network to process data passing said data access point, said processing comprising:
    determining, by a packet header parser, what a next packet header will be, when the current packet header will end, and a next state of said packet data parser at a beginning of a next packet header, said state being dependent upon said determined next packet header, said determining based upon data contained in a first template temporarily stored at the probe and associated with said packet header parser; passing said determined next packet header's starting point as an offset, and said next state of said packet data parser, to at least one data control element;
    determining, by the packet header parser, a match to retrieve one or more packet filter values, and in response to said match, filtering selected data, said selected data being selected based upon a template data contained in a second template temporarily stored at the probe and associated with a packet filter control element; and
    extracting selected data from said data access point in real time by at least one data extraction element under control of said at least one data control element, said selected data being selected based upon template data contained in a third template temporarily stored at the probe and associated with each said data extraction element in combination with said passed determined next packet header, said header's starting point as an offset, and said next state of said packet data parser.

5. The method of claim 4 wherein said probe is contained on one of the following: a single application specific integrated circuit (ASIC) chip; a single field programmable gate array (FPGA) device.

6. The method of claim 4 further comprising: sending results of said extracting from said probe to a location remote from said probe.

7. The method of claim 4 wherein said probe receives said first and second templates via data received at said data access point from a location remote therefrom via the network.

8. The method of claim 4 wherein said determining occurs from default settings when the first and second templates are not available at said probe.

9. The method of claim 4 further comprising: modifying from time to time values associated with particular ones of said first and second templates.

10. A hardware probe, comprising:
a packet header parser configured to employ a temporary packet header parser template received by the probe from a device external to the probe, and further configured to determine whether there is a match between at least one characteristic pertaining to data passing an access point to which the probe is attached in a network and information included in the temporary packet header parser template, and when the match is determined, to produce a packet header parser output signal indicating the match; and at least one packet filter, each packet filter being configured to employ a temporary packet filter template associated with the packet filter and received by the probe from the device external to the probe, and further being configured, in response to the packet header parser output signal indicating the match to retrieve one or more packet filter values from the associated temporary packet filter template and to use the retrieved one or more packet filter values to process data passing the data access point for which the packet data parser determined the match, and further configured in response to said processing to generate a commit signal indicating whether at least a portion of the data passing the data access point for which the packet data parser determined the match should be saved; and at last one packet data extractor, each packet data extractor being configured to employ a temporary packet data extractor template associated with the packet data extractor and received by the probe from the device external to the probe, and further configured, in response to the packet header parser output signal indicating the match and further in response to the commit signal, to extract and save at least the portion of the data passing the data access point for which the packet data parser determined the match and for which the at least one packet filter generated the commit signal.

11. The probe of claim 10, wherein the probe is contained on one of: a single Application Specific Integrated Circuit (ASIC) chip, and a single Field Programmable Gate Array (FPGA) chip.

12. The probe of claim 10, wherein said packet filter template defines fields for use by said packet filter, said fields allowing said packet filter to select particular data from said data passing the data access point for which the packet data parser determined the match.

13. The probe of claim 12, wherein the one or more packet filter values include at least one mask value and at least one data value, and wherein the at least one packet filter is configured to mask the selected data with the at least one mask value to produce masked data, and then to compare the masked data with the at least one data value.

14. The probe of claim 10, wherein the temporary packet header parser template, the temporary packet filter template, and the temporary packet data extractor template are all different from each other.

15. The probe of claim 10, wherein said at least one packet filter and said at least one packet data extractor operate in parallel on a word by word basis on the data passing the data access point for which the packet data parser determined the match.

16. The probe of claim 10, further comprising at least one counter for counting a number of packets matched by the at least one packet filter as well as counting a size of said matched packets.

17. The probe of claim 10, further comprising at least one packet sampler configured to work in conjunction with said at least one packet filter to control said at least one packet data extractor, said packet sampler reducing an amount of the data passing the data access point that is extracted and saved by the packet data extractor.

18. The probe of 17, wherein the data passing the data access point is arranged in packets, and wherein the packet sampler is configured to control the packet data extractor such that the packet data extractor only extracts and save data from every $N^{th}$ packet, where N>1, in response to the packet header parser output signal indicating the match and further in response to the commit signal.

19. The probe of 18, wherein the packet sampler is configured to repeatedly select a value for N within a defined range between X and Y such that over a large number of repetitions, a mean value of N will equal Z, where $X<Y$ and $X \leq Y \leq Z$.

20. The probe of claim 10, wherein the at least one packet filter comprises a plurality of packet filters, wherein one temporary packet filter template is associated with all of the plurality of packet filters.

21. The probe of claim 10, wherein the at least one packet filter comprises a plurality of packet filters, wherein each of the plurality of packet filters is associated with a different temporary packet filter template.

22. The probe of claim 10, wherein the probe is configured to receive the temporary packet header parser template, the temporary packet filter template, and the temporary packet data extractor template from the device external to the probe via the network.

* * * * *